United States Patent [19]

Ho

[11] 4,414,541
[45] Nov. 8, 1983

[54] MOTION SENSING SYSTEM

[75] Inventor: Eugene Y. Ho, San Carlos, Calif.

[73] Assignee: Techne Electronics Limited, Palo Alto, Calif.

[21] Appl. No.: 268,569

[22] Filed: May 29, 1981

[51] Int. Cl.³ ............................................. G08B 13/00
[52] U.S. Cl. ..................................... 340/566; 331/65; 340/65; 340/571; 340/689; 73/579; 73/652; 73/DIG. 1; 307/117
[58] Field of Search ............... 340/670, 676, 686, 551, 340/65, 568, 571, 689, 573, 566; 307/117; 73/579, 651, 652, DIG. 1; 331/64, 65

[56] References Cited

U.S. PATENT DOCUMENTS

| | | | |
|---|---|---|---|
| 2,154,260 | 4/1939 | Brandenburger | 331/65 X |
| 3,602,806 | 8/1971 | Czekajewski | 340/551 X |
| 3,658,052 | 4/1972 | Alter | 340/573 X |
| 3,747,012 | 7/1973 | Buck | 340/551 X |
| 4,001,718 | 1/1977 | Wilson et al. | 340/686 X |
| 4,028,567 | 6/1977 | Maillot | 340/566 X |
| 4,053,849 | 10/1977 | Bower et al. | 331/65 |
| 4,106,000 | 8/1978 | Maillot | 340/566 X |
| 4,110,741 | 8/1978 | Hubert et al. | 340/573 |
| 4,164,075 | 8/1979 | Hunyar | 340/686 X |
| 4,267,522 | 5/1981 | Periot | 340/686 X |
| 4,286,261 | 8/1981 | Wagner et al. | 340/551 X |

*Primary Examiner*—David L. Trafton
*Assistant Examiner*—Joseph Nowicki
*Attorney, Agent, or Firm*—Flehr, Hohbach, Test, Albritton & Herbert

[57] ABSTRACT

A motion sensing system which can be oriented in any position and which provides an output signal when it is moved or tilted. The system includes an oscillator which provides an output signal; the amplitude of the oscillator signal is modulated responsive to motion. A signal level detector provides an output signal when the modulation amplitude exceeds a predetermined level. The output signal from the level detector indicates excessive motion and can be used to provide an alarm or to control associated equipment.

7 Claims, 3 Drawing Figures

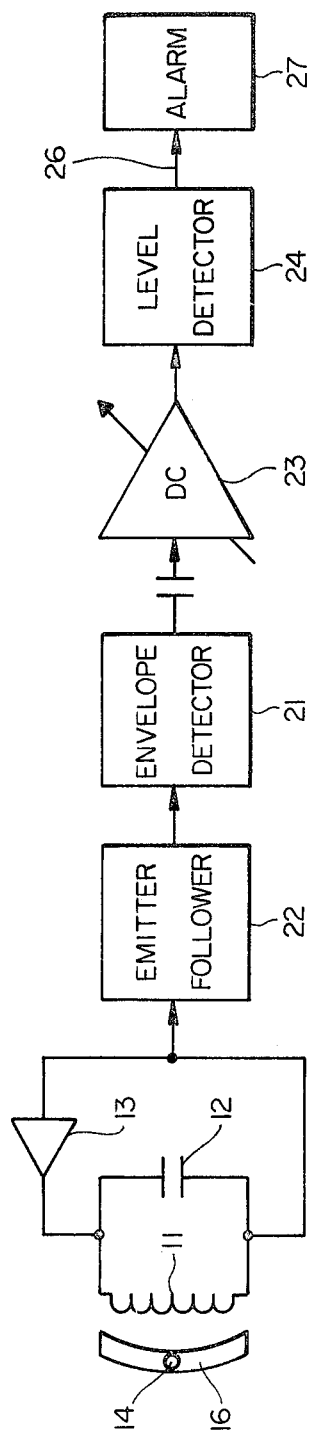
FIG_1
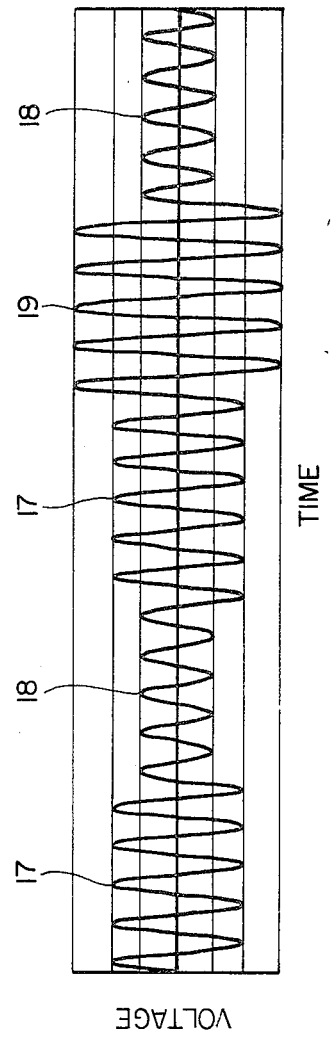
FIG_2

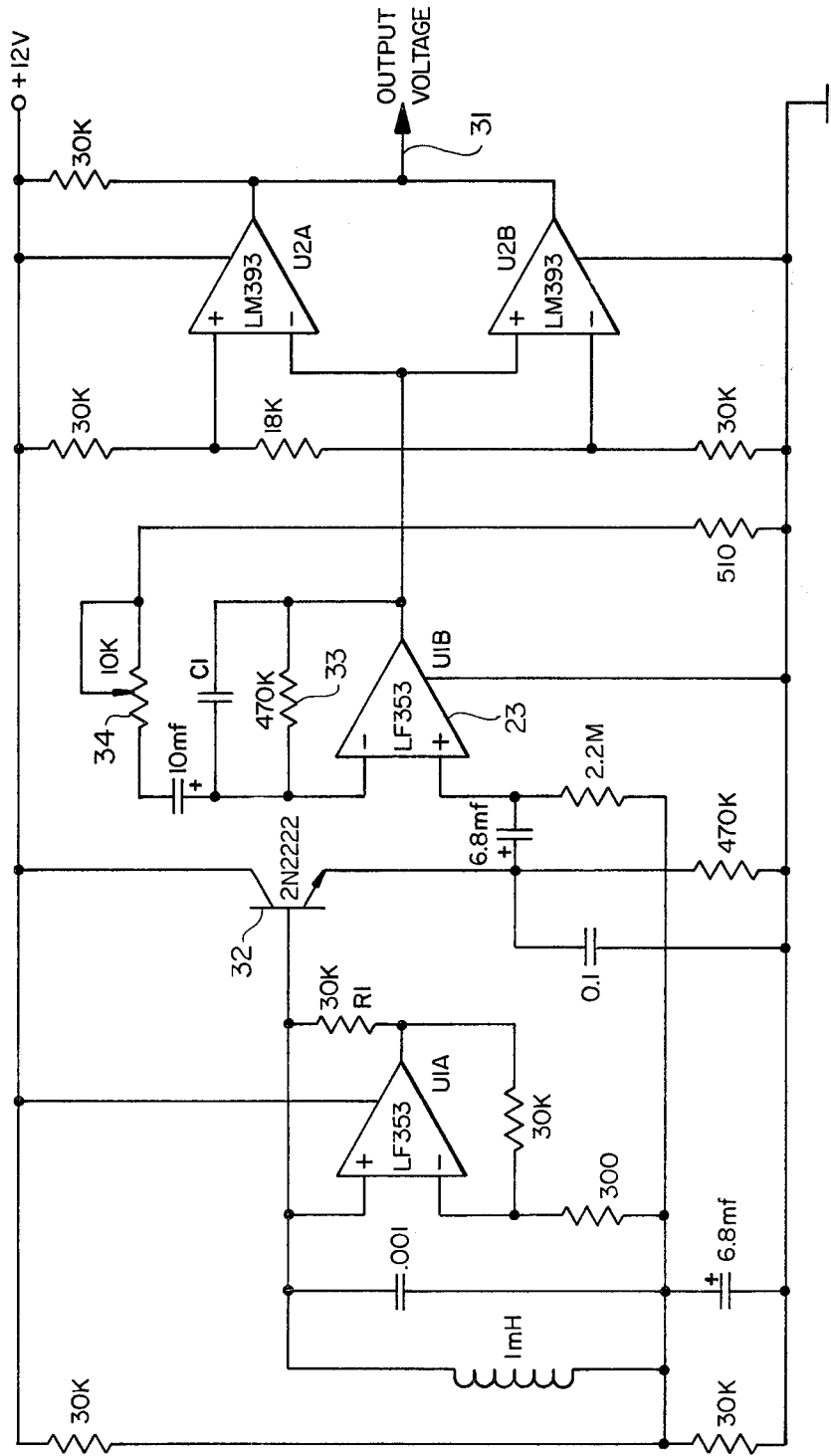
FIG_3

MOTION SENSING SYSTEM

This invention relates generally to a motion sensing system and more particularly such a system useful in alarm applications.

In U.S. Pat. No. 4,205,300 there is described a vehicle anti-theft alarm system. The system includes a plurality of position sensitive switches for sensing motion of the vehicle. Each of said switches has an individual initial state dependent upon the position of the supporting surface for the vehicle and is arranged to change its state from its initial state in response to motion. The switches are respectively either opened or closed in their initial state depending upon the orientation of the vehicle surface and position of the switch. Some of said switches being open in the initial state and others being closed in the initial state. Switches individually selectively change from the initial state in response to movement of the vehicle. Circuit means are responsive to said switches individually being selectively changed from the initial state in response to movement of the vehicle for operating an inhibiting or alarm circuit.

The system is particularly advantageous because it does not require specific orientation of the motion detector. The motion detector can be mounted at any orientation and it is only movement which serves to provide a signal when one or more of the plurality of switches changes its state. Mercury switches disposed at different orientations in a switch assembly are described in one embodiment of the patent.

In U.S. Pat. No. 3,074,049 there is described an alarm system in which a motion sensitive switch is adjustably mounted on a vehicle in a position to be tilted when the vehicle is shaken or tilted. The switch must be accurately positioned so that it is in its open condition to set to alarm. Motion of the vehicle closes the switch and provides the requisite alarm. The requirement of first having to position the switch to set the alarm is a serious drawback of this system.

It is an object of the present invention to provide an improved motion sensing system.

It is another object of the present invention to provide a motion sensing system which can be oriented in any position and which provides an output signal when the system is moved or tilted.

The foregoing and other objects of the invention are achieved by a motion sensing system including a tuned electrical circuit which is driven to oscillate at a frequency determined by the circuit components of the oscillator. A motion responsive means is coupled to the tuned circuit and serves to modulate the amplitude of the oscillations responsive to motion. Means are connected to receive the oscillator signal and provide an output signal when amplitude modulation exceeds a predetermined amount. The output signal is used to operate an associated alarm, inhibit or other circuit means.

The foregoing will be more clearly understood from the following description read in connection with the accompanying drawing.

FIG. 1 is a block diagram of a motion sensing system in accordance with the present invention;

FIG. 2 shows typical signals on the tuned circuit shown in FIG. 1;

FIG. 3 is a detailed circuit diagram of the system shown in FIG. 1.

Referring to FIG. 1 the motion sensing system is seen to include a tuned circuit comprising an inductance 11 and a capacitance 12. An amplifier 13 is connected to the tuned circuit to supply power to cause the circuit to oscillate at a predetermined frequency dependent upon the values of the inductance and capacitance. The amplifier circuit, as will be presently described, is a current limited amplifier circuit so that it operates as a current source to supply substantially constant power to the oscillator circuit so that the circuit normally operates at a predetermined amplitude.

A mercury drop 14 disposed in a glass tube 16 is mounted along the axis of the coil forming the inductor 11. Motion of the tube will cause the mercury drop to move along the tube in and out of the center of the coil where the magnetic field is the strongest. This action introduces variable losses in the tuned circuit and changes the amplitude of the voltages across the tuned circuit. It is clear that other movable elements may be used in place of the mercury drop. For example a metal slug mounted on weak springs could be used. Any motion sensitive member which introduces losses to the tuned circuit will suffice. This is illustrated in FIG. 2 wherein the normal oscillating amplitude is shown at 17, the oscillations 18 indicated a positioning of the mercury drop to introduce heavy losses and therefore decrease the amplitude of oscillations whereas the sections 19 shows an increase in amplitude of oscillations which occurs when the mercury drop is at its extreme position. Thus, during normal quiescent operation the oscillations will have one value such as value 17 while with motion the mercury drop will move along the tube 16 and provide both decreased amplitude oscillations such as shown 18 and increased amplitude oscillations such as shown at 19.

An envelope detector 21 is connected to the oscillator via the emitter follower 22 so that the envelope detector does not load the tuned circuit. The envelope detector receives the amplitude modulated oscillation and provides a varying direct current (DC) output signal and is capacitively coupled to the DC amplifier 23. The output of the amplifier 23 is a variable voltage which corresponds to the motion of the mercury drop. The varying output voltage from the amplifier 23 is supplied to a level detector 24 which can comprise a pair of comparators set to high and low limits to accomodate for the swing of the output voltage of the amplifier as indicated by the regions 18 and 19 of FIG. 2. When the voltage is outside of this window the circuit considers that motion has occurred and will provide an output signal on the line 26. The signal can then be employed to drive a suitable alarm 27 such as a horn, lights, etc. or drive an inhibit circuit. If the motion sensing system is used in a vehicle it may drive an anti-theft system such as shown in U.S. Pat. No. 4,205,300.

FIG. 3 is a detail circuit diagram of one embodiment of the present invention which was constructed and satisfactorily operated to provide output voltages at 31 which were +12 volts for no motion and 0 volts when the motion detector sensed motion. The component values used in the system are shown on the drawing, FIG. 3. The amplifiers U1A, U1B were LF353. Dual operational amplifiers and U2A, U2B were LM393 comparators.

Operational amplifier U1A and associated components form amplifier 13 for driving the tuned circuit comprising the inductor 11 and capacitor 12. The output from the operational amplifier is shown fed to the tuned circuit through resistor R1 to sustain oscillations. The resistor R1 is selected to make the amplifier look like a current source. The voltage across the coil, being fed by current source decreases as the mercury drop moves closer to the center of the coil when the losses of the tuned circuit is at maximum as illustrated at 18, FIG. 2. Although the oscillating frequency of the circuit is not critical in this example it was selected to be about 160 KHz for the convenience of using a reasonable sized component in the associated circuits. The amplifier U1A operates at its maximum output to provide the constant drive to the circuit.

The transistor 32 is connected as an emitter follower to reduce loading of the tuned circuit and also acts as the envelope detector which provides an output signal having an amplitude corresponding to the envelope of the oscillator signal, FIG. 2, for the DC amplifier 23 including U1B and associated components. The output of this amplifier is a slow varying DC voltage about 100 times larger than the output of the envelope detector. The capacitor C1 and resistor 33 provide a feedback circuit for the amplifier 23 so that it does not respond to detector ripple or other interference which might be picked up by the high impedance of the envelope detector. The gain of the amplifier can be adjusted with potentiometer 34.

The output from the amplifier 23 is applied to the level detector 24. The level detector which comprises dual comparators U2A and U2B is connected as a window detector. In the present example when the voltage output goes below 4.62 V or above 7.38 V the output comparators are driven to ground potential. In such condition the output line 31 is grounded. This is used to trigger an associated circuit such as an intrusion alarm, light or other associated alarm system.

Thus, it is seen that there has been provided a simple motion detector which operates independently of the quiescent position of the alarm motion detector (mercury drop) and which provides an output when there is motion.

What is claimed:

1. Apparatus for detecting motion of an object on which it is placed comprising:

an oscillator including a tuned circuit providing oscillations, motion responsive means in said apparatus coupled to said tuned circuit and serving to move and modulate the amplitude of the oscillations of said oscillator responsive to motion of the object, and means connected to said oscillator to receive the oscillations and provide an output signal when the amplitude modulation of the oscillations exceeds a predetermined amount.

2. An apparatus as in claim 1 in which said oscillator includes a current limited amplifier connected to said tuned circuit.

3. An apparatus as in claim 1 in which said tuned circuit includes an inductance and said motion responsive means is coupled to said inductance to introduce losses into said tuned circuit.

4. An apparatus as in claim 2 in which said tuned circuit includes an inductance and said motion responsive means is coupled to said inductance to introduce losses into said tuned circuit.

5. An apparatus for detecting motion of an object on which it is placed comprising:

an oscillator including a tuned circuit providing output oscillations, motion responsive means in said apparatus coupled to said tuned circuit to move and modulate the amplitude of the oscillations responsive to motion of the object, an envelope detector connected to said oscillator to receive the oscillations and provide an output signal whose amplitude is representative of the amplitude of the oscillations, means for receiving said output signal and provide an alarm signal when the amplitude of said output signal falls outside a predetermined upper or lower level.

6. An apparatus as set in claim 5 in which said oscillator includes a current limited amplifier connected to said tuned circuit.

7. An apparatus as in claim 5 in which said tuned circuit includes an inductance and said motion responsive means is coupled to said inductance to introduce losses into said tuned circuit.

* * * * *